(12) United States Patent
Xiong et al.

(10) Patent No.: US 9,563,073 B2
(45) Date of Patent: Feb. 7, 2017

(54) COMBINED SPLITTER, ISOLATOR AND SPOT-SIZE CONVERTER

(71) Applicant: Lumentum Operations LLC, Milpitas, CA (US)

(72) Inventors: Wei Xiong, Shenzhen (CN); Michael C. Larson, Oakland, CA (US); Zhaoming Li, Shenzhen (CN); Fenhong Zhou, Shenzhen (CN)

(73) Assignee: Lumentum Operations LLC, Milpitas, CA (US)

( * ) Notice: Subject to any disclaimer, the term of this patent is extended or adjusted under 35 U.S.C. 154(b) by 291 days.

(21) Appl. No.: 14/316,997

(22) Filed: Jun. 27, 2014

(65) Prior Publication Data
US 2015/0378186 A1  Dec. 31, 2015

(51) Int. Cl.
*G02B 27/28* (2006.01)
*G02F 1/09* (2006.01)
*G02B 6/27* (2006.01)
*G02B 6/32* (2006.01)
*G02B 6/42* (2006.01)

(52) U.S. Cl.
CPC ............. *G02F 1/093* (2013.01); *G02B 6/2746* (2013.01); *G02B 6/32* (2013.01); *G02B 6/4209* (2013.01); *G02B 6/4286* (2013.01)

(58) Field of Classification Search
CPC ....... G02B 5/30; G02B 5/3025; G02B 6/2746; G02B 27/28; G02B 27/283; G02B 27/286; G02B 13/08; G02B 13/10; G02B 13/12; G02B 27/09; G02B 27/0911; G02B 27/0916; G02B 27/0938; G02B 27/0977; G02F 1/09; G02F 1/093

USPC ......... 359/483.01, 484.01, 484.02, 484.03,359/485.01, 485.02, 489.01, 489.08, 489.09,359/668, 669, 670; 372/703

See application file for complete search history.

(56) References Cited

U.S. PATENT DOCUMENTS

| | | | | |
|---|---|---|---|---|
| 5,128,956 A | * | 7/1992 | Aoki | G02B 6/4248 372/101 |
| 5,394,414 A | * | 2/1995 | Kozlovsky | G02F 1/37 372/22 |
| 5,581,403 A | * | 12/1996 | Kobayashi | G02B 27/09 359/484.04 |
| 6,330,117 B1 | | 12/2001 | Seo | 359/702 |
| 6,532,321 B1 | * | 3/2003 | Zhang | G02B 6/2746 372/703 |
| 7,664,352 B1 | | 2/2010 | Okayama | 385/43 |
| 2001/0030807 A1 | | 10/2001 | Ikari | 359/484.03 |
| 2005/0100263 A1 | | 5/2005 | Shi et al. | 385/11 |
| 2006/0222283 A1 | | 10/2006 | Salib et al. | 385/11 |

(Continued)

*Primary Examiner* — Arnel C Lavarias
(74) *Attorney, Agent, or Firm* — Harrity & Harrity, LLP

(57) ABSTRACT

An integrated and compact multifunctional optical isolator (i.e., a combined splitter, isolator, and spot-size converter), which is suitable for use in a TOSA, includes input optics including a first polarizer, a Faraday rotator, and a second polarizer. The input optics include a wedge having a partially reflective coating disposed on a first face thereof. The input beam is incident on the first face at a non-normal angle of incidence such light passing through the wedge is refracted to a second face of the wedge, which is tilted relative to the first face by a predetermined wedge angle. At least one of the non-normal angle of incidence and the predetermined wedge angle is determined dependence upon a refractive index of the wedge material and a target anamorphic magnification of the input beam of light.

21 Claims, 11 Drawing Sheets

(56) References Cited

U.S. PATENT DOCUMENTS

| | | |
|---|---|---|
| 2009/0022184 A1 | 1/2009 | Ito et al. .......................... 372/20 |
| 2009/0116838 A1 | 5/2009 | Kihara ............................ 398/79 |
| 2013/0170785 A1 | 7/2013 | Gao ................................ 385/8 |
| 2013/0258468 A1 | 10/2013 | Fukui et al. .............. 359/484.03 |
| 2014/0071518 A1 | 3/2014 | Inbar ............................ 359/327 |

\* cited by examiner

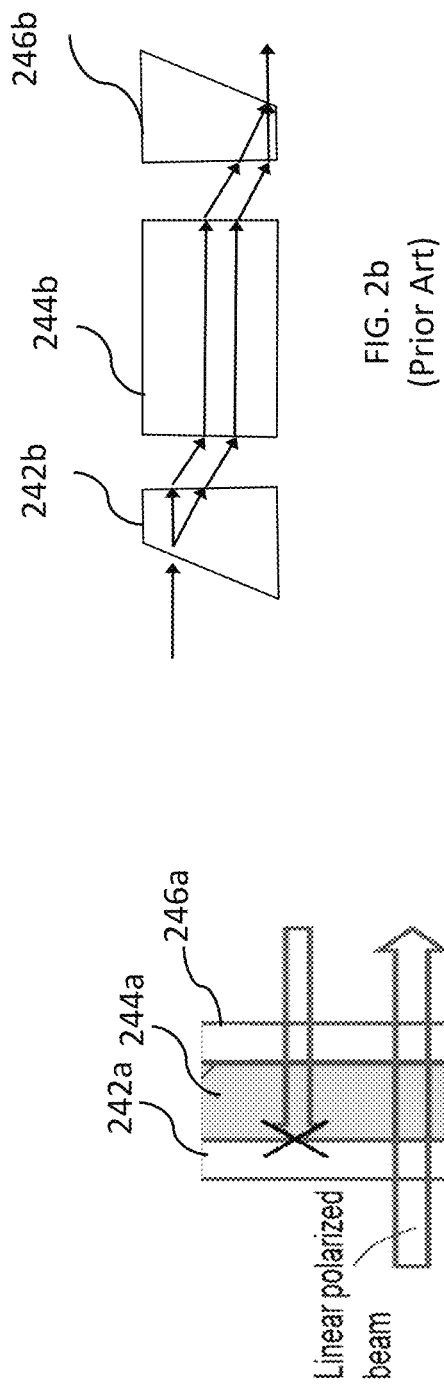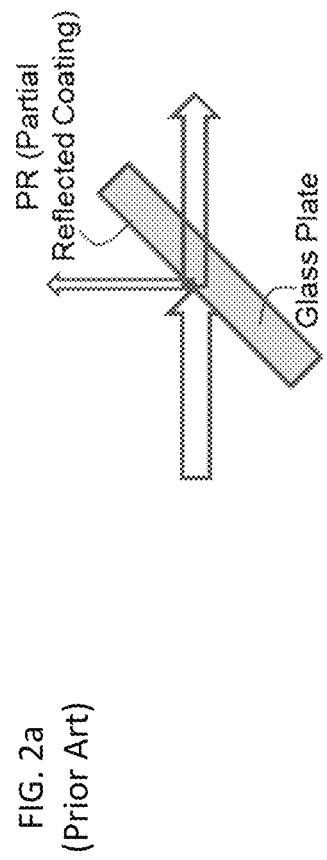

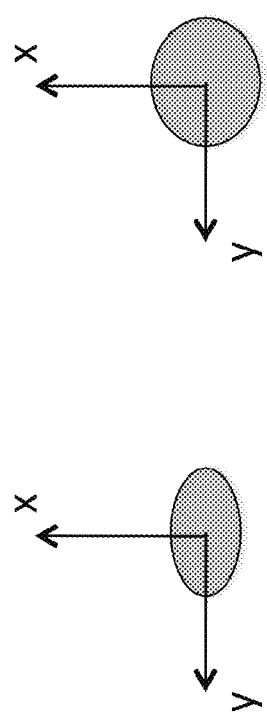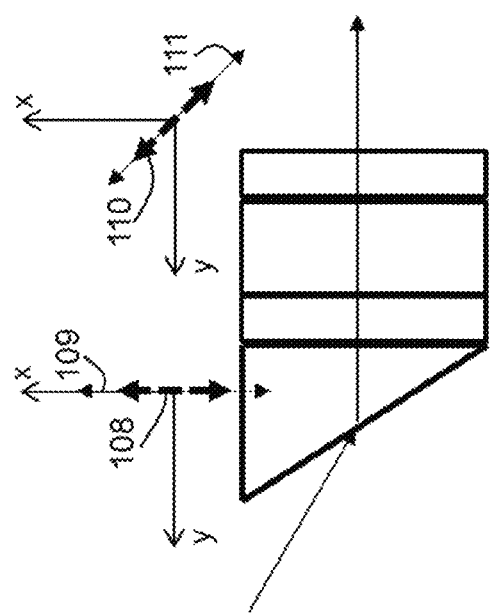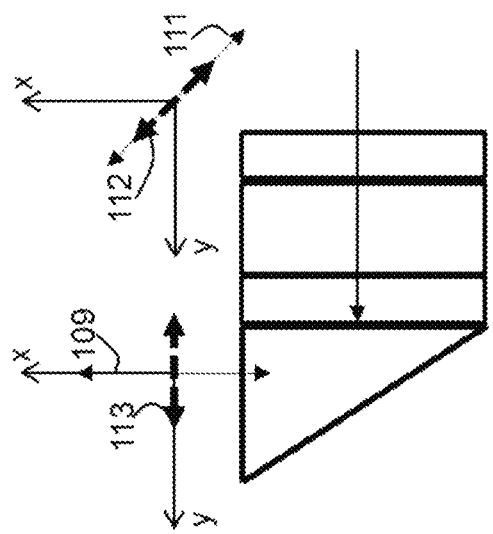

COMBINED SPLITTER, ISOLATOR AND SPOT-SIZE CONVERTER

CROSS-REFERENCE TO RELATED APPLICATIONS

Not Applicable.

TECHNICAL FIELD

The present invention relates generally to optical isolators, and in particular to multifunctional optical isolators suitable for use in a TOSA.

BACKGROUND

Optical transceivers are commonly used in optical networking for conversion between an optical signal and an electrical signal. In general, an optical transceiver includes a Transmit Optical Subassembly (TOSA), which typically includes a light-emitting device such as a laser chip, and a Receiver Optical Subassembly (ROSA), which typically includes a light-receiving device such as photodiode.

Referring to FIG. 1, a typical TOSA includes a spot size converter 120, an isolator 140, and a beam splitter 160. The spot size converter 120 shapes and/or sizes the beam of light emitted from the laser chip 101 and collimated by the collimating lens 115 to improve coupling efficiency into an optical fiber, and thus provide higher power. The isolator 140 prevents back-reflection light from reaching the laser chip 101, while allowing the light to pass to the beam splitter 160. The beam splitter 160 allows a portion of the light to be tapped and diverted to a power/wavelength monitor 170, while allowing the remaining light to be transmitted to the optical fiber coupled to the fiber pigtail 190 via the focusing lens 175.

Conventionally, the spot size converter 120, isolator 140, and beam splitter 160 in a TOSA are individual optical components, which function independently from the others.

The spot size converter 120 shapes and/or sizes the beam of light emitted from the laser chip (e.g., a laser diode). In particular, since the output beam of light of most laser diodes has an elliptical cross-section (e.g., elongated in the vertical direction), the spot size converter will often reduce the beam aspect ratio (e.g. beam waist ratio along horizontal and vertical axes) such that the cross-section of the beam of light is closer to circular. Conventionally, spot size converters are waveguide-based, and thus can be integrated on the laser chip. For example, one example of waveguide-based spot size converter is described in U.S. Pat No. 7,664,352. In general, waveguide-based spot-size converters include waveguides sections having tapered widths or thicknesses. Since waveguide-based spot-size converters are used to match the mode of the output waveguide of the laser chip 101 to the mode of larger optical fiber coupled to the fiber pigtail 190 they are often referred to as mode transformers. Unfortunately, since waveguide-based spot-size converters are integrated with the laser chip, the waveguide structure is more complex, with a more complicated fabrication process. In addition, these integrated waveguide structures create extra light loss due to transmission mode mismatch. Other approaches used to shape and/or size a beam emitted from a laser include using collimating/focusing lenses or a pair of anamorphic prisms. Unfortunately, these approaches result in a relatively bulky spot-size converter.

The isolator 140 is an optical isolator, which passes the forward propagating light advancing from the laser chip 101 and prevents the backward propagating light from propagating to the laser chip 101 (e.g., back reflected light). In general, the optical isolator 140 may be a polarization dependent isolator or a polarization independent isolator.

A polarization dependent isolator typically includes an input polarizer, a Faraday rotator, and an output polarizer (i.e., often referred to as an analyzer). Both the input polarizer and analyzer are absorptive polarizers (e.g., an absorptive film polarizer), which absorb the unwanted polarization states. Referring to FIG. 2a, which shows one embodiment of a polarization dependent isolator, the input polarizer 242a is polarized vertically, whereas the analyzer 246a is polarized at 45°. In the forward propagating direction, the light passes through the input polarizer 242a and becomes polarized vertically, passes through the Faraday rotator 244a (e.g., latched garnet) wherein the polarization is rotated by 45°, and passes through the analyzer 246a. In the backward propagation direction, the light passes through the analyzer 246a and becomes polarized at 45°, passes through the Faraday rotator 244a which again rotates the polarization by 45°, and is blocked by the input polarizer 242a (i.e., since the light is polarized horizontally, but the input polarizer only passes light polarized vertically).

A polarization independent isolator typically includes an input birefringent wedge, a Faraday rotator, and an output birefringent wedge. Both the input and output birefringent wedges are beam-splitting polarizers, wherein an unpolarized beam is split into two beams with opposite polarization states. Referring to FIG. 2b, which shows one embodiment of a polarization independent isolator, the input birefringent wedge 242b has its ordinary polarization direction vertical and its extraordinary polarization direction horizontal, whereas the output birefringent wedge 246b has its ordinary polarization direction at 45°, and its extraordinary polarization direction at −45°. In the forward propagating direction, the light passes through the input birefringent wedge 242b and is split into its vertical (o-ray) and horizontal (e-ray) components, passes through the Faraday rotator 244b which rotates both the o-ray and e-ray by 45° such that the o-ray is at 45° and the e-ray is at −45°, and is recombined by the output birefringent wedge 246b. In the backward propagating direction (not shown), the light is split into the o-ray (at 45°) and the e-ray (at −45°) components by the second birefringent wedge 246b, passes through the Faraday Rotator 244b, which rotates both rays by 45°, and passes through the first birefringent wedge 242b, which causes the two rays to diverge such that the two rays are vertically offset from the forward propagating input ray, and thus prevented from propagating to the input port. In general, the light beam is incident on the oblique surface of the first birefringent wedge at essentially the wedge angle. Notably, although the use of beam-splitting polarizers advantageously provides a polarization independent isolator, the beam-splitting polarizers are more bulky, expensive, and complicated than absorptive polarizers.

The beam splitter 160 allows some of the light being transmitted to the optical fiber connected to the fiber pigtail 190 to be diverted, and thus allows power/wavelength monitoring. Referring to FIG. 3, one example of a commonly used beam splitter 160 in TOSAs is a plate beam splitter. Plate beam splitters often include a thin film reflection coating (e.g., partially reflective coating) disposed on a surface of a glass plate, which is positioned at 45° angle of incidence, so that a portion of the light striking the plate beam-splitter is reflected and another portion is transmitted. The reflected portion is directed towards the power/wavelength monitor.

As discussed above, the spot size converter 120, isolator 140, and beam splitter 160 conventionally are provided as individual parts/components, which are packaged together in a TOSA package. Notably, the use of three different parts results in a relatively high material cost, makes the package bulky (e.g., due to spacing of parts), and makes the assembly of the parts relatively complicated.

In U.S. Pat. No. 6,330,117, Seo combines isolator and beam splitter functions together in a single component. Referring to FIG. 4, the integrated component includes a first polarizer 442 (i.e., a wedge shaped beam-splitting polarizer), a Faraday rotator 444, and a second polarizer 446 (i.e., a wedge shaped beam-splitting polarizer). The first polarizer 442 has a partial reflective coating disposed on a front surface thereof, and thus functions as a beam splitter. In operation, a collimated beam of light is incident on the first polarizer 442, wherein a portion of the light is reflected and directed to a power monitor, while the remaining portion is transmitted to the Faraday rotator 444 and the second polarizer 446. Advantageously, providing the partial reflective coating on a surface of the wedge shaped input polarizer 442 provides a simpler structure and obviates the need for a separate plate beam splitter. Unfortunately, since the isolator uses two wedge-shaped birefringent crystals, the resulting component is relatively bulky.

SUMMARY

In accordance with one aspect of the instant invention, there is provided an integrated and compact multifunctional optical isolator (i.e., a combined splitter, isolator, and spot-size converter), which is suitable for use in a TOSA.

In accordance with one aspect of the instant invention there is provided a multifunctional optical isolator comprising: an input port for transmitting an input beam of light; input optics optically disposed between the input port and an output port, the input optics including a first polarizer for transmitting light having a first polarization; a second polarizer optically disposed between the input optics and the output port for transmitting light having a second polarization, the first polarization different than the second polarization; and a non-reciprocal rotator optically disposed between the input optics and the second polarizer for rotating the polarization of light transmitted therethrough such that light propagating in a forward propagating direction having the first polarization passes through the second polarizer to the output port, and light propagating in a backward propagation direction having the second polarization is not passed through the first polarizer to the input port, wherein the input optics include a wedge having a partially reflective coating disposed on a first face thereof, the partially reflective coating for reflecting a first portion of the input beam of light away from the wedge and allowing a second portion of the input beam of light to pass into the wedge, the first face for receiving the input beam of light at a non-normal angle of incidence and refracting the second portion of the input beam of light to a second face of the wedge, the first face tilted relative to the second face by a predetermined wedge angle, at least one of the non-normal angle of incidence and the predetermined wedge angle determined in dependence upon a refractive index of the wedge material and a target anamorphic magnification of the input beam of light.

In accordance with one aspect of the instant invention there is provided a multifunctional optical isolator comprising: an input port for transmitting an input beam of light; a first polarizer optically disposed between the input port and an output port for transmitting light having a first polarization, the first polarizer comprising a birefringent crystal having its optic axis substantially parallel to the first polarization, the birefringent crystal having a first face having a partially reflective coating disposed thereon, the partially reflective coating for reflecting a first portion of the input beam of light away from the birefringent crystal and allowing a second portion of the input beam of light to pass into the birefringent crystal, the first face for receiving the input beam of light at a non-normal angle of incidence and refracting the second portion of the input beam of light to a second face of the wedge, the first face tilted relative to the second face by a predetermined wedge angle, at least one of the non-normal angle of incidence and the predetermined wedge angle determined in dependence upon a refractive index of the birefringent crystal and a target anamorphic magnification of the input beam of light; a second polarizer optically disposed between the first polarizer and the output port for transmitting light having a second polarization, the first polarization different than the second polarization; and a non-reciprocal rotator optically disposed between the first polarizer and the second polarizer for rotating the polarization of light transmitted therethrough such that light propagating in a forward propagating direction having the first polarization passes through the second polarizer to the output port, and light propagating in a backward propagation direction having the second polarization is not passed through the first polarizer to the input port.

In accordance with one aspect of the instant invention there is provided a multifunctional optical isolator comprising: an input port for transmitting an input beam of light; a first polarizer optically disposed between the input port and an output port for transmitting light having a first polarization, the first polarizer comprising a polarization dependent coating deposited on a first face of a wedge, the polarization dependent coating for reflecting a first portion of the input beam of light having the first polarization away from the wedge and allowing a second portion of the input beam of light having the first polarization to pass into the wedge, the first face for receiving the input beam of light at a non-normal angle of incidence and refracting the second portion of the input beam of light to a second face of the wedge, the first face tilted relative to the second face by a predetermined wedge angle, at least one of the non-normal angle of incidence and the predetermined wedge angle determined in dependence upon a refractive index of the wedge material and a target anamorphic magnification of the input beam of light; a second polarizer optically disposed between the first polarizer and the output port for transmitting light having a second polarization, the first polarization different than the second polarization; and a non-reciprocal rotator optically disposed between the first polarizer and the second polarizer for rotating the polarization of light transmitted therethrough such that light propagating in a forward propagating direction having the first polarization passes through the second polarizer to the output port, and light propagating in a backward propagation direction having the second polarization is not passed through the first polarizer to the input port.

BRIEF DESCRIPTION OF THE DRAWINGS

Exemplary embodiments of the invention will now be described in conjunction with the drawings in which:

FIG. 2a is a schematic diagram of a prior art polarization dependent optical isolator;

FIG. 2b is a schematic diagram of a prior art polarization independent optical isolator;

FIG. 3 is a schematic diagram of a prior art plate beam-splitter;

FIG. 7C is a schematic diagram illustrating the shape of the beam of light before and after passing through the wedge prism illustrated in FIG. 7A;

FIG. 7D is a schematic diagram illustrating the polarization state of a beam of light in the forward propagating direction for the integrated component illustrated in FIG. 7A;

FIG. 7E is a schematic diagram illustrating the polarization state of a beam of light in the backward propagating direction for the integrated component illustrated in FIG. 7A;

It will be noted that throughout the appended drawings, like features are identified by like reference numerals.

DETAILED DESCRIPTION

Figure 1:
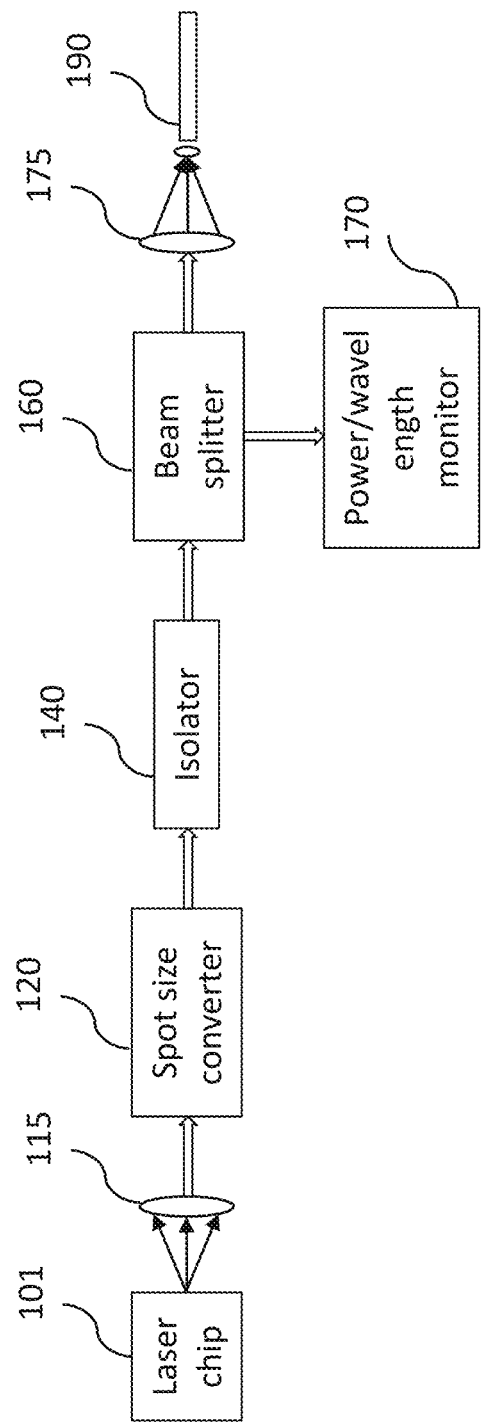
FIG. 1 is a schematic diagram of a prior art TOSA.
Figure 4:
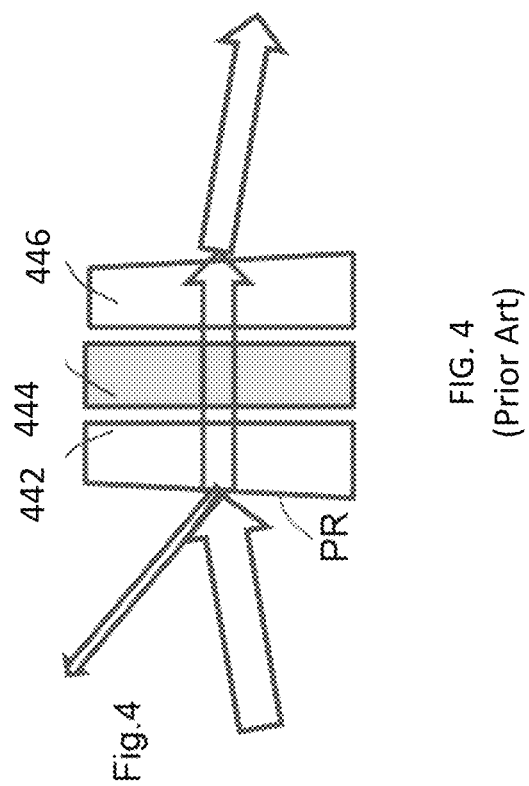
FIG. 4 is a schematic diagram of a prior art isolator core wherein the isolator and beam splitter functions are provided by a single component.
Figure 5:
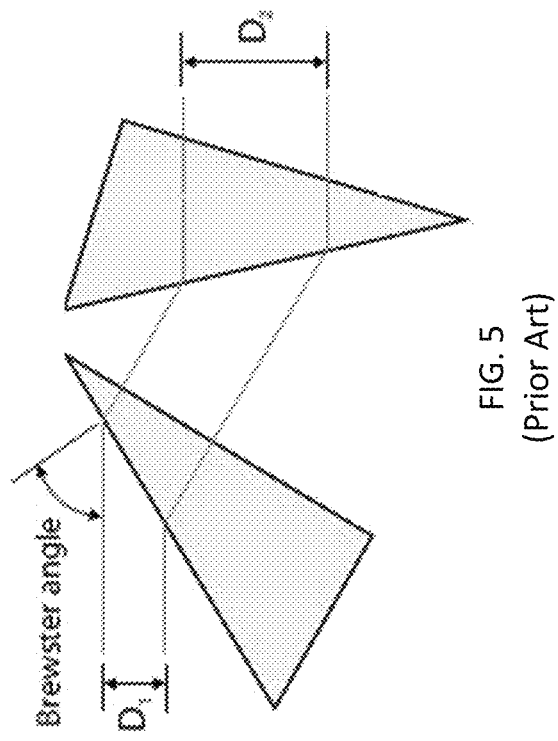
FIG. 5 is a schematic diagram of a pair of anamorphic wedge prisms (prior art)

As discussed above, one approach that has been used to shape and/or size light transmitted from a laser is to use a pair of anamorphic wedge prisms. This approach, which is based on the refraction effect, exploits the changes in beam radius upon refraction at flat prism interfaces. Referring to FIG. 5, as the beam of light enters the first prism, the interface between air and prism material (e.g., glass) refracts the beam at an angle determined by Snell's Law. Since the beam of light transitions from a medium having a lower refractive index (e.g., $n_{air} \approx 1$) to a medium having a higher refractive index (e.g., $n_{glass} \approx 1.5$), with a non-normal incident angle, it is refracted towards the normal of the interface between the two media. In general, there is an anamorphic magnification connected with this type of refraction. More specifically, the beam diameter in the plane of incidence may be stretched/magnified by a certain factor. The degree of magnification is determined by the angle of incidence and the refractive index of the two interface materials. When the refracted beam of light is transmitted to the exiting surface of the first prism with normal incidence, the beam of light largely passes therethrough. However, when the beam of light is transmitted to the exiting surface at non-normal incidence, the beam is again refracted. Since the beam of light now transitions from a medium having a higher refractive index (e.g., $n_{glass} \approx 1.5$) to a medium having a lower refractive index (e.g., $n_{air} \approx 1$), the beam is refracted away from the normal of the exiting surface. The type of refraction is connected to an anamorphic compression. The overall anamorphic magnification of the first prism is the product of the magnification factor at the input surface and the compression factor at the exit surface. Accordingly, anamorphic prisms are typically designed such that light is incident on one of the surfaces at or near normal incidence. Referring again to FIG. 5, after exiting the first prism (e.g., substantially normal to the exiting surface), the beam of light may pass through the second prism, wherein refraction forces the beam of light to exit along an output optical path substantially parallel to the input optical path (i.e., with a positional offset).

In order to minimize optical loss, the anamorphic prisms typically are oriented such that the input beam of light is incident at Brewster's angle and such that the output beam of light exits from a surface coated with an appropriate antireflection (AR) coating. In particular, if the first anamorphic prism is oriented such that light is incident at or near Brewster's angle, the reflections (e.g., losses) at the interface may be minimized for p-polarized light (i.e., wherein the polarization is parallel to the plane of incidence). According to Brewster's law, Brewster's angle $\theta_B$ is given by $$\theta_B = \arctan(n_2/n_1) \quad (1)$$

where $n_2$ is the refractive index of the prism material and $n_1$ is the refractive index of air. If the prism is a glass prism (e.g., $n_2 \approx 1.5$ and $n_1 \approx 1$), Brewster's angle for visible light is about 56°. Accordingly, a linearly polarized beam of light transmitted from a laser diode (i.e., which is generally p-polarized light) can be collimated by a collimating lens (e.g., an aspherical lens, not shown) and transmitted through the prism with little loss.

The overall anamorphic magnification of the anamorphic prism pair may be largely dependent on the angle of tilt between the two anamorphic prisms. In general, by adjusting the angle of tilt between the two prisms, most anamorphic prism pairs are able to provide magnification ratios from 2:1 to 6:1. By comparison, depending on the type photodiode, the aspect ratio of an elliptical beam transmitted from a laser diode could be as low as 2:1 or as high as 5:1.

Although it is common to use a pair of anamorphic prisms to provide anamorphic magnification and/or so that the input and output beams of light are substantially parallel, or even two pairs of anamorphic prisms so that the positional offset is also removed/reduced, it is also possible to use a single wedge prism to shape and/or size a beam of light transmitted from a laser chip. Like the anamorphic prism pair approach, the single wedge prism approach enlarges the beam size along one axis only (i.e., or reduces the beam size if used in reverse), while keeping the beam size in the perpendicular direction unchanged.

Figure 6:
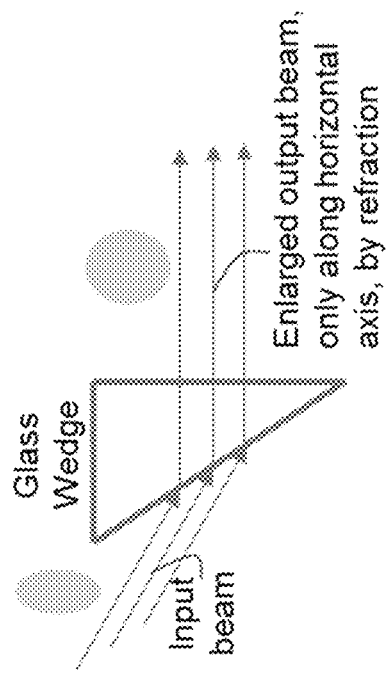
FIG. 6 is a schematic diagram showing a top view of a single wedge prism.

Referring to FIG. 6, this approach, which also is based on the refraction effect and exploits the changes in beam radius upon refraction at flat prism interfaces, involves positioning the single wedge prism in the optical path of light transmitted from a laser. As the beam of light enters the prism from the left, the interface between air and prism material (e.g., glass) refracts the beam at an angle determined by Snell's Law. Since the beam of light transitions from a medium having a lower refractive index (e.g., $n_{air} \approx 1$) to a medium having a higher refractive index (e.g., $n_{glass} \approx 1.5$), at a non-normal incident angle, it is refracted towards the normal of the interface between the two media. As discussed above, there is an anamorphic magnification connected with this type of refraction. More specifically, the beam diameter in the plane of incidence is stretched/magnified by a certain factor (i.e., illustrated as enlarged along the horizontal axis). The degree of magnification is determined by the angle of incidence, the refractive index of the two interface materials, and the wedge angle. Notably, since only a single wedge prism is used, the magnification cannot be tailored by adjusting the angle between the two wedges. In addition, since only a single wedge prism is used, the relative magnification provided is lower. Accordingly, it is not necessarily ideal for the angle of incidence to be equal to Brewster's angle.

Advantageously, both the anamorphic prisms pair approach and the single wedge prism approach use refraction effects rather than collimating/focusing effects (i.e., changes of wavefront curvature). Accordingly, spot-size converters using anamorphic prisms rather than cyclindrical lenses and/or integrated waveguide structures are associated with fewer aberrations. While the single prism approach is less bulky than the anaphoric prism pair approach, it may also cause the light beam to exit the wedge at an angle relative to the input direction (i.e., the single anamorphic prism is a refractive element that deviates the beam of light at a set angle).

In accordance with one embodiment of the instant invention, the single wedge approach to providing spot-size conversion is used to provide a combined splitter, isolator, and spot-size converter with a reduced number of parts.

Figure 7A:
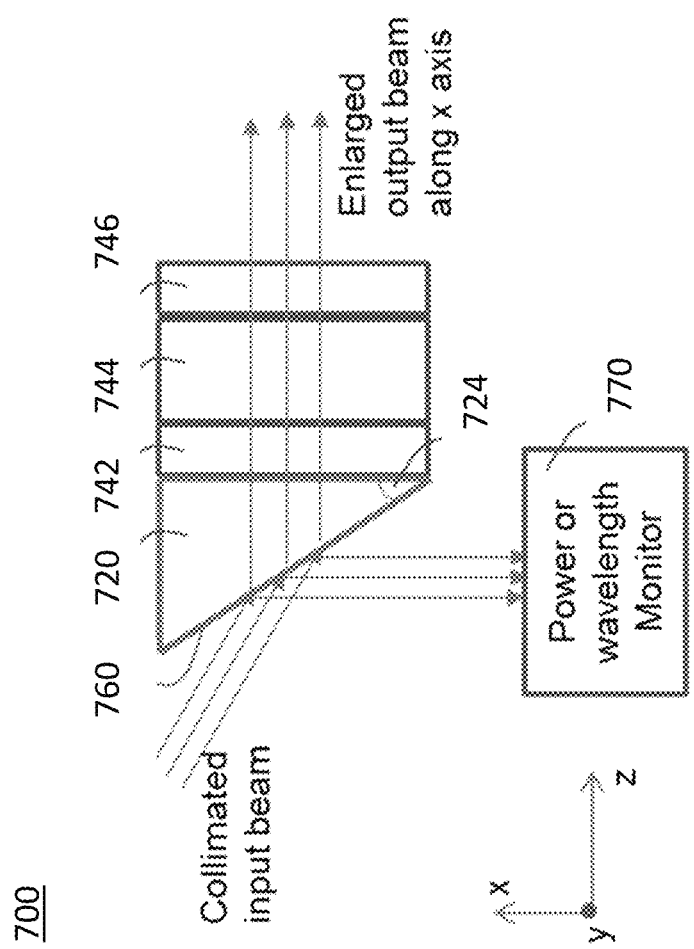
FIG. 7A is a top view of a combined splitter, isolator, and spot-size converter, in accordance with one embodiment of the instant invention.

Referring to FIG. 7a, one embodiment of a combined splitter, isolator, and spot-size converter is shown. The integrated optical component 700 includes a wedge prism 720, an input polarizer 742, a Faraday rotator 744, and an output polarizer 746. The integrated optical component 700 also includes a partially reflective coating 760 disposed on a face of the wedge prism for directing light to a power and/or wavelength monitor 770.

The wedge prism 720 may be a simple anamorphic prism for providing spot-size conversion. In general, the wedge prism 720 may be fabricated from a transparent material having a refractive index that is higher than air (e.g., glass or a synthetic resin). The wedge prism 720 has a first surface for receiving a beam of light (e.g., the collimated input beam emitted from a laser (not shown)) and a second surface from which the beam of light exits the prism. The first and second surfaces have an angle therebetween referred to as the wedge angle 724. The wedge angle 724 is specifically designed based on the refractive index of the prism material, the incident angle, and the target beam enlarging ratio (i.e., the required magnification). For example in one embodiment, the wedge angle is between 10 and 50°. In another embodiment, the wedge angle is between 30 and 45°. In yet another embodiment, fabricating the wedge prism from BK7 glass and with a wedge angle of about 40° has been found to significantly improve the aspect ratio of a collimated beam of light emitted from a laser diode (i.e., so that it is close to 1).

Figure 7B:
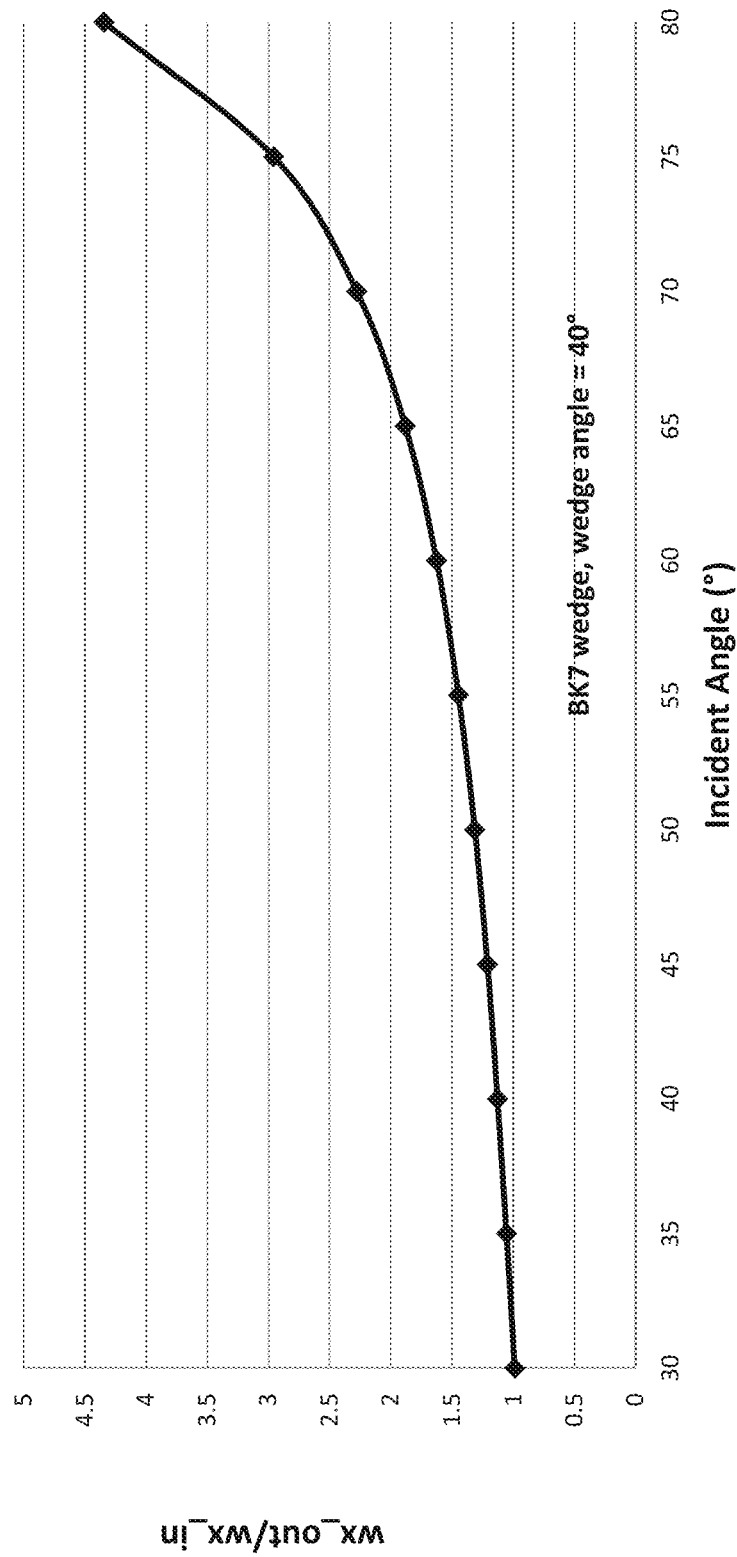
FIG. 7B is a plot of magnification as a function of incident angle for the wedge prism illustrated in FIG. 7A.

In general, the relationship between the refractive index of the prism material, the incident angle, and the required magnification is provided by Eq. 2, which is derived from Snell's law. More specifically, Eq. 2 shows that the beam size along the x axis before ($w_{x,in}$) and after ($w_{x,out}$) passing through the wedge prism is related by:

$$w_{x,out} = w_{x,in} \cdot \cos(a\sin(\sin(\theta_{in})n_{wedge}))\cos(\theta_{in}) \cdot \cos(a\sin(n_{wedge} \cdot \sin\theta_{wedge} - a\sin(\sin(\theta_{in})n_{wedge})))\cos(\theta_{wedge} - a\sin(\sin(\theta_{in})n_{wedge})) \quad (2)$$

where $\theta_{in}$ refers to the incident angle of the input beam of light, $n_{wedge}$ refers to the refractive index of the prism material, and $\theta_{wedge}$ refers to the wedge angle 724. Referring to FIG. 7b, which shows the theoretical magnification (i.e., ratio of output to input beam radius in the x-direction) as a function of incident angle, it is clear that a prism formed of BK7 and having a wedge angle of 40° will provide 2 times beam enlarging along x-direction (i.e., and substantially no magnification along the y-direction) when the incident angle is about 67°. Accordingly, the wedge prism functions as a spot-size converter.

Both the input polarizer 742 and output polarizer 746 (i.e., also referred to as the analyzer) are absorptive polarizers (e.g., absorptive film polarizers), which absorb the unwanted polarization states. The input polarizer 742 is polarized in the direction of the x-axis, whereas the analyzer 746 is polarized at 45° to the x-axis.

The Faraday rotator 744 is a magneto-optic device (e.g., latched garnet) that rotates the polarization angle of light passing therethrough according to the Faraday Effect. More specifically, the Faraday rotator 744 is a non-reciprocal rotator that rotates the polarization of a light beam passing therethrough in a first propagating direction by a predetermined angle β and in a second opposite propagating direction by -β. In this embodiment, the Faraday rotator 744 is designed such that polarized light transmitted from the input polarizer is rotated by 45° counterclockwise. Together, the input polarizer 742, Faraday rotator 744, and output polarizer 746 function as an optical isolator that passes forward propagating light emitted from the laser (not shown) and prevents backward propagating light from reaching the laser (e.g., including back reflected light).

The partially reflective coating 760, which is supported by the first surface of the wedge prism 720 (e.g., disposed on), is for tapping a portion of the light directed to the wedge prism 720, and directing it to the power/wavelength monitor 770. In one embodiment, the partially reflected coating is a metallic and/or dielectric film designed to produce the desired transmission-to-reflective ratio. For example, in one embodiment the partially reflective coating is a dielectric coating designed to reflect between 5-30% of the incident light towards the power/wavelength monitor (e.g., when it is incident at a predetermined incident angle). In one embodiment, the incident angle is between 30 and 80°. In another embodiment, incident angle is between 40 and 70°. In general, the incident angle is designed in dependence upon the required anamorphic magnification provided by the wedge prism 720. The power and/or wavelength monitor 770 is positioned to receive the light reflected from the partially reflective coating 760. Accordingly, together with the first surface of the wedge prism 720, the partially reflective coating 760 functions as a beam-splitter.

In one embodiment, the wedge prism 720, input polarizer 742, Faraday rotator 744, and output polarizer 746 are mounted together in fixed positions to provide a single part. For example, in one embodiment the wedge prism 720, input polarizer 742, Faraday rotator 744, and output polarizer 746 are mounted together as a single part in a TOSA package. In general, the wedge prism 720 may be mounted such that the normal of the second surface of wedge prism is substantially parallel to the optical axes of the input polarizer 742, Faraday rotator 744, and output polarizer 746. For example, in one embodiment the wedge prism 720, input polarizer 742, Faraday rotator 744, and output polarizer 746 are attached with a suitable adhesive (e.g., a transparent epoxy).

In operation, in the forward propagating direction, linearly polarized light emitted from a laser (not shown) and collimated by a lens (e.g., an aspherical lens, not shown) is transmitted from an input port towards the first surface of the wedge prism 720, which is coated with the partially reflective coating 760. Since the linearly polarized light is incident with a non-normal incident angle, a portion of the linearly polarized light is reflected by the partially reflective coating 760 towards the power and/or wavelength monitor 770, while the remaining linearly polarized light is transmitted through to the wedge prism 720.

As a result of the nature of laser chips, the beam of linearly polarized light transmitted towards the partially reflective coating 760 will have an elliptical cross section. Referring to FIG. 7c, the elliptical cross-section of the linearly polarized input beam has a major axis that is parallel to the y-axis. As a result of the refractive effect at the first surface of the prism 720, the linearly polarized light (e.g., which is generally p-polarized light) is refracted such that the beam size of the input beam along the x-axis is expanded, while the beam size along the y-axis remains the same, thus shaping the beam to have a substantially circular cross-section as it passes through the second surface of the prism 720.

The linearly polarized light exiting the wedge prism 720 is directed to the input polarizer 742, Faraday Rotator 744, and output polarizer 746, which as discussed above, together function as an optical isolator. Since the input polarizer 742 is polarized in the direction of the x-axis (i.e., the polarization axis is parallel to the x-axis), it only passes light polarized in the x-axis direction (i.e., p-polarized light). More specifically, referring also to FIG. 7d, the input polarizer 742, which has a transparent polarization direction shown as 109, may pass linearly polarized light having a polarization indicated by 108 without significant loss, while absorbing light have a polarization perpendicular to 108. After propagating through the Faraday rotator 744, which is designed to rotate linearly polarized light 45° anti-clockwise, the beam's polarization is rotated 45° to be 110. Since the beam's polarization has been rotated by 45° anti-clockwise, the beam will also pass through the analyzer 746 with little loss (i.e., since the polarization axis of the analyzer 111 is at the same angle) and be transmitted to the output port.

In the backward propagating direction, light transmitted to the second polarizer 746 (e.g., from the output port) may only pass therethrough if it has the polarization 112, which is substantially parallel to the polarization axis 111 of the second polarizer. After propagating through the Faraday rotator 744, which is designed to rotate linearly polarized light 45° anti-clockwise, the beam's polarization will have been rotated 45° anti-clockwise to be 113. Since the polarization 113 is substantially perpendicular to the transparent polarization direction 109 of the first polarizer 742, this light may be absorbed completely by the first polarizer 742.

Advantageously, the integrated optical component 700 discussed above utilizes the inclined surface (i.e., tilted relative to the optical axes of the polarizers) of the wedge 720 as a support for the partially reflective coating 760, thus reducing the number of elements required to provide the component. In addition, since the function of a spot-size converter and the beam-splitter are provided by a single coated wedge, the fabrication of the combined splitter, isolator, and spot-size converter is simplified.

Figure 8A:
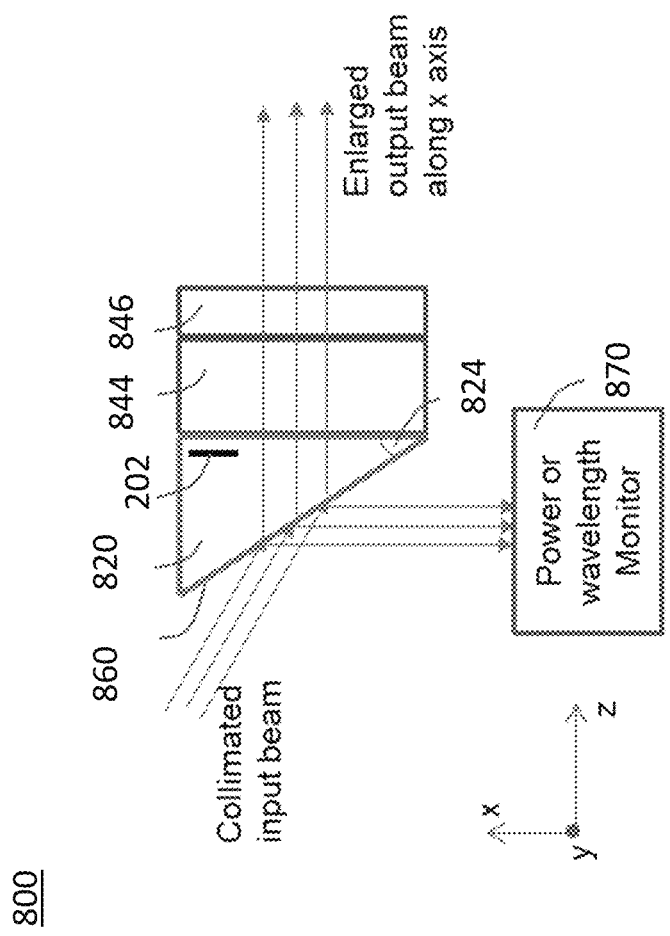
FIG. 8A is a top view of a combined splitter, isolator, and spot-size converter, in accordance with another embodiment of the instant invention.
Figure 8C:
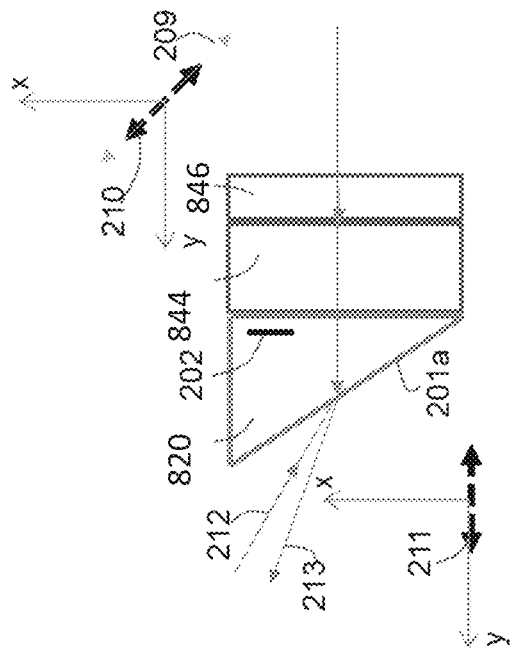
FIG. 8C is a schematic diagram illustrating the polarization state of a beam of light in the backward propagating direction for the integrated component illustrated in FIG. 8A.

Referring to FIG. 8a, another embodiment of a combined splitter, isolator, and spot-size converter is shown. The integrated optical component 800 includes a birefringent wedge 820, a Faraday rotator 844, and an output polarizer 846. The integrated optical component 800 also includes a partially reflective coating 860 disposed on a surface of the birefringent wedge 820 for directing light to a power and/or wavelength monitor 870.

The birefringent wedge 820 functions as a spot-size converter and as a polarizer. In general, the birefringent wedge 820 may be fabricated from a transparent, uniaxial, birefringent material having a refractive index (e.g., $n_e$ or $n_o$) that is higher than air (e.g., a birefringent crystal such as rutile ($TiO_2$)). The birefringent wedge 820 has a first surface for receiving a beam of light (e.g., the collimated input beam emitted from a laser (not shown)) and a second surface from which the beam of light exits the wedge. The first and second surfaces have an angle therebetween referred to as the wedge angle 824. In one embodiment, the wedge angle 824 is specifically designed (e.g., using Eq. 2) based on the refractive indices of the wedge material, the incident angle, and the target beam enlarging ratio (i.e., the required magnification). Accordingly, the birefringent wedge 820 functions as a spot-size converter. In one embodiment, the wedge angle is between 10 and 50°. In another embodiment, the wedge angle is between 25 and 45°.

In this embodiment, the optic axis of the birefringent wedge 820 is parallel to the x-axis. Accordingly, if unpolarized light strikes the wedge at a non-normal angle of incidence, the component of light having its polarization perpendicular to the optic axis (e.g., polarized along the y-axis) will be refracted according to the standard law of refraction for a material having refractive index $n_o$, whereas the component of light having its polarization parallel to the optic axis (e.g., p-polarized light, polarized along the x-axis) will be refracted at a different angle determined by the incident angle and the birefringence. Since the laser (not shown) provides substantially p-polarized light (i.e., polarization is parallel to the x-z plane), the birefringent wedge 820 will refract the incident light as an extraordinary component (i.e., the refractive index is $n_e$).

The output polarizer 846 (i.e., also referred to as the analyzer) may be an absorptive polarizer (e.g., an absorptive film polarizer), which absorbs the unwanted polarization states. The analyzer 846 is polarized at 45° to the x-axis.

The Faraday rotator 844 is a magneto-optic device (e.g., latched garnet) that rotates the polarization angle of light passing therethrough according to the Faraday Effect. More specifically, the Faraday rotator 844 is a non-reciprocal rotator that rotates the polarization of a light beam passing therethrough in a first propagating direction by a predetermined angle β and in a second opposite propagating direction by −β. In this embodiment, the Faraday rotator 844 is designed such that polarized light transmitted from the birefringent wegde 820 is rotated by 45° counterclockwise. Together, the birefringent wedge 820, Faraday rotator 844, and output polarizer 846 function as an optical isolator that passes forward propagating light emitted from the laser (not shown) and prevents backward propagating light from reaching the laser (e.g., including back reflected light).

The partially reflective coating 860, which is supported by the first surface of the bierfringent wedge 820 (e.g., disposed on), is for tapping a portion of the light directed to the birefringent wedge 820, and directing it to the power/wavelength monitor 870. In one embodiment, the partially reflected coating is a metallic and/or dielectric film designed to produce the desired transmission-to-reflective ratio. For example, in one embodiment the partially reflective coating is a dielectric coating designed to reflect between 5-30% of the incident light towards the power/wavelength monitor (e.g., when it is incident at a predetermined incident angle). In general, the incident angle, which often may be between 30 and 80°, and more commonly between 40 and 70°, is designed in dependence upon the required anamorphic magnification provided by the birefringent wedge 820 and the wedge angle. The power and/or wavelength monitor 870 is positioned to receive the light reflected from the partially reflective coating 860. Accordingly, together with the first surface of the birefringent wedge 820, the partially reflective coating 860 functions as a beam-splitter.

In one embodiment, the birefringent wedge 820, Faraday rotator 844, and output polarizer 846 are mounted together in fixed positions to provide a single part. For example, in one embodiment the birefringent wedge 820, Faraday rotator 844, and output polarizer 846 are mounted together as a single part in a TOSA package. In general, the birefringent wedge 820 may be mounted such that the normal of the second surface of wedge is substantially parallel to the optical axes of the Faraday rotator 844 and output polarizer 846. For example, in one embodiment the birefringent wedge 820, Faraday rotator 844, and output polarizer 846 are attached with a suitable adhesive (e.g., a transparent epoxy).

In operation, in the forward propagating direction, linearly polarized light emitted from a laser (not shown) and collimated by a lens (e.g., an aspherical lens, not shown) is transmitted from an input port towards the first surface of the birefringent wedge 820, which is coated with the partially reflective coating 860. Since the linearly polarized light is incident with a non-normal incident angle, a portion of the linearly polarized light is reflected by the partially reflective coating 860 towards the power and/or wavelength monitor 870, while the remaining linearly polarized light is transmitted through to the birefringent wedge 820.

Since the optic axis of the birefringent wedge 820 is parallel to the x-axis, incident light polarized parallel to the optic axis 822 (e.g., polarized in along the x-axis) is refracted as an extraordinary light component, whereas incident light polarized perpendicular to the optic axis 822 (e.g., polarized along the y-axis) travels straight through as an ordinary light component. Since the laser (not shown) provides substantially p-polarized light (i.e., polarization is parallel to the x-z plane), the birefringent wedge 820 will refract the incident light as an extraordinary component (i.e., refractive index is $n_e$) in a direction substantially normal to the second surface of the birefringent wedge 820.

As a result of the nature of the laser, the beam of linearly polarized light transmitted towards the partially reflective coating 860 typically may have an elliptical cross section (i.e., with a major axis that is parallel to the y-axis). As a result of the refractive effect at the first surface of the birefringent wedge 820, the linearly polarized light is refracted such that the beam size of the input beam along the x-axis is expanded, while the beam size along the y-axis remains the same, thus shaping the beam to have a substantially circular cross-section (e.g., or other cross-section) as it passes through the second surface of the wedge 820.

Figure 8B:
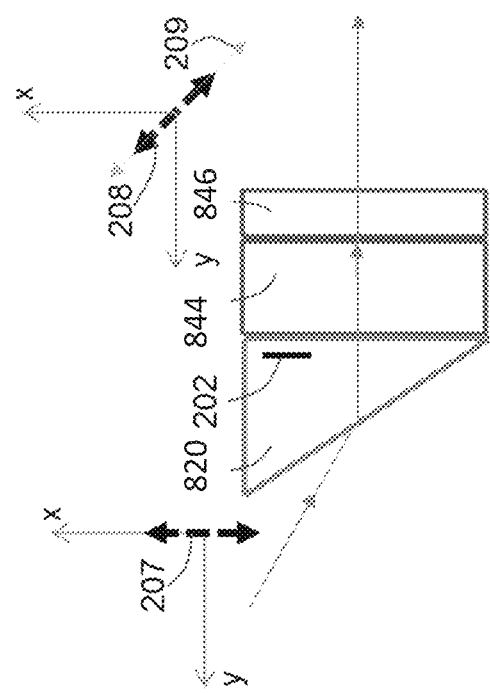
FIG. 8B is a schematic diagram illustrating the polarization state of a beam of light in the forward propagating direction for the integrated component illustrated in FIG. 8A.

The linearly polarized light exiting the birefringent wedge 820 is directed to the Faraday Rotator 844 and output polarizer 846. Referring also to FIG. 8*b*, the collimated light beam exiting the birefringent wedge 820 is polarized along the x-axis (i.e., has polarization orientation 207). After propagating through the Faraday rotator 844, which is designed to rotate linearly polarized light 45° anti-clockwise, the beam's polarization is rotated 45° to be 208. Since the beam's polarization has been rotated by 45° anti-clockwise, the beam will also pass through the analyzer 846 with little loss (i.e., since the polarization axis of the analyzer 209 is also at 45°) and be transmitted to an output port.

In the backward propagating direction, light 210 transmitted to the second polarizer 846 (e.g., from the output port) may only pass therethrough if it has a polarization parallel to 209. After propagating through the Faraday rotator 844, which is designed to rotate linearly polarized light 45° anti-clockwise, the beam's polarization will have been rotated 45° anti-clockwise to be light 211. Since this polarization light 211 is substantially perpendicular to the optic axis 202 of the birefringent wedge 820, it will see a refractive index $n_o$ and may be refracted on surface 201*a* at a different angle along optical path 213 compared to that of input beam 212. As a result of this optical path deviation, the backward propagating light beam 213 cannot couple back into the laser chip. Accordingly, the birefringent wedge 820, Faraday rotator 844, and output polarizer 846 function together as optical isolator.

Advantageously, the integrated optical component 800 discussed above utilizes the inclined surface (i.e., tilted relative to the optical axis of the analyzer) of the birefringent wedge 820 as a support for the partially reflective coating 860, thus reducing the number of elements required to provide the component. In addition, since the integrated optical component uses an absorptive polarizer 846 rather than a second birefringent wedge as the analyzer, the incident angle and wedge angle can be designed to provide the desired anamorphic magnification without having to consider the alignment/effects of a second birefringent wedge. For example, in U.S. Pat. No. 6,330,117, the incident angle on the wedge (i.e., having a wedge angle that is not designed for spot size converting) is limited to small values (e.g., 3-12°) in order to reduce polarization dependent loss. In addition, since the integrated optical component 800 utilizes a birefringent wedge to provide the beam-splitter, spot-size converter, and first polarizer functions, the structure and fabrication process are further simplified.

Figure 9A:
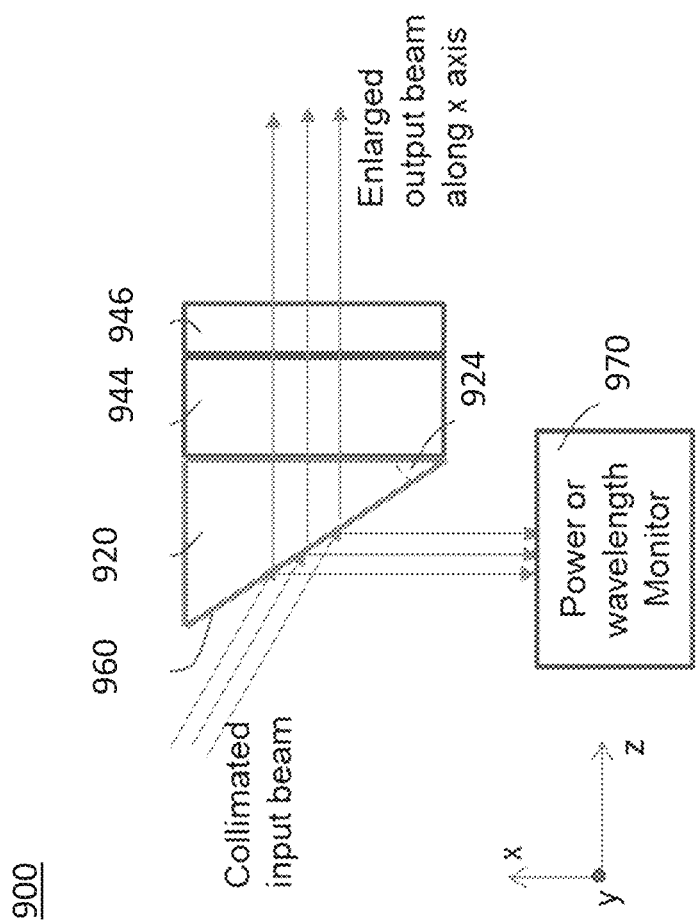
FIG. 9A is a top view of a combined splitter, isolator, and spot-size converter, in accordance with another embodiment of the instant invention.
Figure 9C:
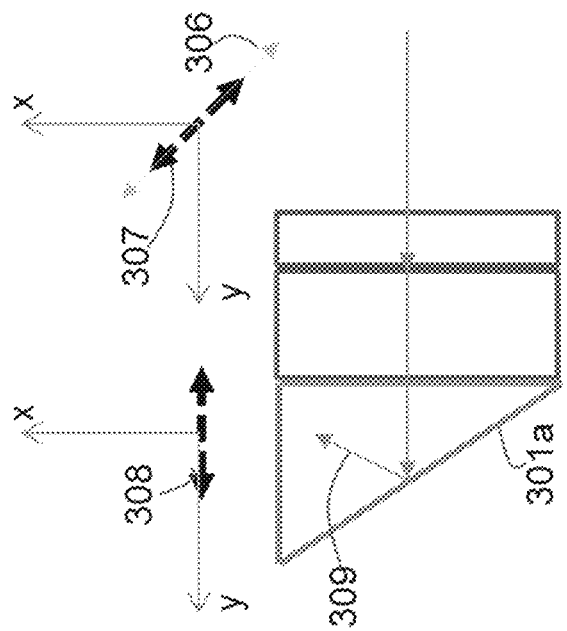
FIG. 9C is a schematic diagram illustrating the polarization state of a beam of light in the backward propagating direction for the integrated component illustrated in FIG. 9A.

Referring to FIG. 9*a*, another embodiment of a combined splitter, isolator, and spot-size converter is shown. The integrated optical component 900 includes a wedge prism 920, a Faraday rotator 944, and an output polarizer 946. The integrated optical component 900 also includes a polarization dependent coating 960 disposed on a surface of the wedge 920 for directing light to a power and/or wavelength monitor 970.

The wedge prism 920, which functions as a spot-size converter, beam-splitter, and a polarizer, may be a simple anamorphic prism. In general, the wedge prism 920 may be fabricated from a transparent material having a refractive index that is higher than air (e.g., glass or a synthetic resin). The wedge prism 920 has a first surface for receiving a beam of light (e.g., the collimated input beam emitted from a laser (not shown)) and a second surface from which the beam of light exits the prism. The first and second surfaces have an angle therebetween referred to as the wedge angle 924. The wedge angle 924 is specifically designed (e.g., using Eq. 2) based on the refractive index of the prism material, the incident angle, and the target beam enlarging ratio (i.e., the required magnification). In one embodiment, the wedge angle is between 10 and 50°. In another embodiment, the wedge angle is between 30 and 45°.

The wedge prism 920 supports a polarization dependent coating 960 on the first surface thereof. In one embodiment, the polarization dependent coating 960 is designed with partial reflection for p-polarized light (i.e., polarization parallel to x-z plane), and high reflection for s-polarized light (i.e., polarization perpendicular to x-z plane). For example, in one embodiment the polarization dependent coating is a dielectric coating designed to reflect between 5-30% of the p-polarized incident light, but reflect >99.5% of s-polarized light. Accordingly, the wedge prism 920 having the polarization dependent coating functions as both a polarizer and a beam splitter (e.g., as a polarizing beam splitter). The power and/or wavelength monitor 970 is positioned to receive the reflected p-polarized light, while the p-polarized light passing through the wedge prism 920 is transmitted to the Faraday rotator 944.

The Faraday rotator 944 is a magneto-optic device (e.g., latched garnet) that rotates the polarization angle of light passing therethrough according to the Faraday Effect. More specifically, the Faraday rotator 944 is a non-reciprocal rotator that rotates the polarization of a light beam passing therethrough in a first propagating direction by a predetermined angle β and in a second opposite propagating direction by −β. In this embodiment, the Faraday rotator 944 is designed such that polarized light transmitted from the wedge prism 920 is rotated by 45° counterclockwise.

The output polarizer 946 (i.e., also referred to as the analyzer) is an absorptive polarizer (e.g., absorptive film polarizers), which absorbs the unwanted polarization states. The analyzer 946 is polarized at 45° to the x-axis.

Together, the coated wedge prism 920, Faraday rotator 944, and output polarizer 946 function as an optical isolator that passes forward propagating light emitted from the laser (not shown) and prevents backward propagating light from reaching the laser (e.g., including back reflected light). More specifically, the coated wedge prism 920 functions as a plate beam splitter, a spot-size converter, and an input polarizer.

In one embodiment, the wedge prism 920, Faraday rotator 944, and output polarizer 946 are mounted together in fixed positions to provide a single part. For example, in one embodiment the coated wedge prism 920, Faraday rotator 944, and output polarizer 946 are mounted together as a single part in a TOSA package. In general, the wedge prism 920 may be mounted such that the normal of the second surface of wedge is substantially parallel to the optical axes of the Faraday rotator 944 and output polarizer 946. For example, in one embodiment the wedge prism 920, Faraday rotator 944, and output polarizer 946 are attached with a suitable adhesive (e.g., a transparent epoxy).

In operation, in the forward propagating direction, linearly polarized light emitted from a laser (not shown) and collimated by a lens (e.g., an aspherical lens, not shown) is transmitted from an input port towards the first surface of the wedge prism 920, which is coated with the polarization dependent coating 960. Since the polarization dependent coating 960 is designed with partial reflection for p-polarized light (i.e., polarization parallel to x-z plane), and high reflection for s-polarized light (i.e., polarization perpendicular to x-z plane), the linearly polarized collimated light beam transmitted from the laser, which is substantially p-polarized light and is incident at a non-normal incident angle, will be split such that a portion of the p-polarized light is reflected by the polarization dependent coating 960 towards the power and/or wavelength monitor 970, while the remaining p-polarized light is transmitted through to the wedge prism 920.

As a result of the nature of the laser, the beam of linearly polarized light transmitted towards the polarization dependent, partially reflective coating 960 typically will have an elliptical cross section (i.e., with a major axis that is parallel to the y-axis). As a result of the refractive effect at the first surface of the wedge prism 920, the linearly polarized light is refracted such that the beam size of the input beam along the x-axis is expanded, while the beam size along the y-axis remains the same, thus shaping the beam to have a substantially circular cross-section (e.g., or other cross-section) as it passes through the second surface of the wedge 920.

Figure 9B:
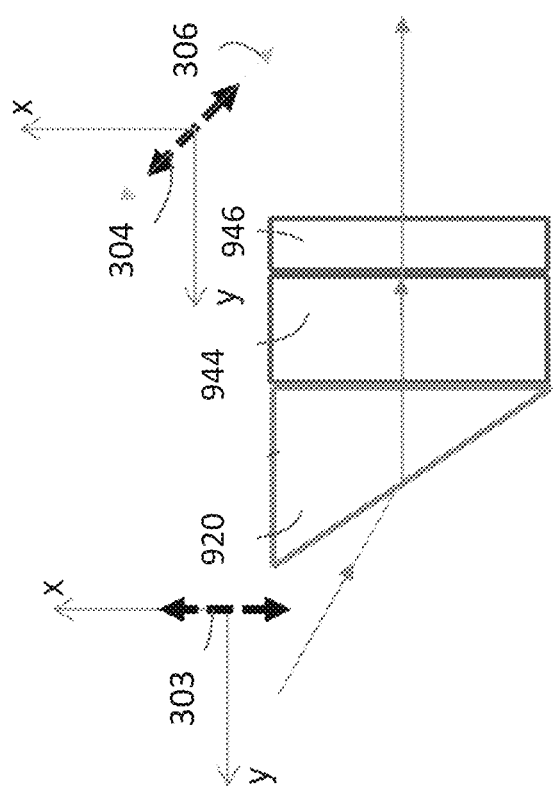
FIG. 9B is a schematic diagram illustrating the polarization state of a beam of light in the forward propagating direction for the integrated component illustrated in FIG. 9A.

The linearly polarized light exiting the wedge 920 is directed to the Faraday Rotator 944 and output polarizer 946. Referring also to FIG. 9b, the collimated light beam exiting the wedge 920 is polarized along the x-axis (i.e., has polarization 303). After propagating through the Faraday rotator 944, which is designed to rotate linearly polarized light 45° anti-clockwise, the beam's polarization is rotated 45° counterclockwise to 304. Since the beam's polarization has been rotated by 45° anti-clockwise, the beam will also pass through the analyzer 946 with little loss (i.e., since the polarization axis of the analyzer 306 is also at 45°) and be transmitted to an output port.

In the backward propagating direction, light 307 transmitted to the second polarizer 946 (e.g., from the output port) may only pass therethrough if it has a polarization parallel to 306. After propagating through the Faraday rotator 944, which is designed to rotate linearly polarized light 45° anti-clockwise, the beam's polarization will have been rotated 45° anti-clockwise to be light 308. Since the polarization dependent coating 960 will only pass p-polarized light (i.e., polarization parallel to x-z plane like 303), the backward propagating beam will be almost fully reflected by surface 301a along optical path 309. Accordingly, the coated wedge prism 920, Faraday rotator 944, and output polarizer 946 function together as optical isolator.

Advantageously, the integrated optical component 900 discussed above utilizes the polarization dependent coating 960 to provide both beam-splitting and polarizer functions, thus reducing the number of elements required to provide the component. In addition, since the integrated optical component 900 discussed above uses a simple glass wedge (e.g., isotropic) having a polarization dependent coating, the fabrication process is further simplified and the costs reduced (e.g., compared to a birefringent wedge).

In the three embodiments described above, the integrated optical components 700, 800, and 900 advantageously use the inclined surface of the wedge (i.e., which is tilted relative to the optical axis of the Faraday rotator) as a support for a coating that reflects a portion of the incident beam of light towards a power and/or wavelength monitor. Since the wedge is used for sizing and/or shaping the incident beam of light, using the inclined surface of the wedge to support the coating reduces the number of elements to be assembled in the combined optical beam splitter, isolator, spot-size converter. The resulting structures, which have the potential to be used as key building blocks in TOSA, have a relatively compact size, lower cost, and simplified assembly process.

Further advantageously, since the wedge angle often is selected to provide the required anamorphic magnification/compression and since the incident angle is often greater than 30°, the power and/or wavelength monitor, which receives the light reflected from the wedge, is positioned/placed such that the resulting assembly is relatively easy and compact.

Numerous other embodiments can be envisaged without departing from the spirit and scope of the invention. Of course, the above embodiments have been provided as examples only. It will be appreciated by those of ordinary skill in the art that various modifications, alternate configurations, and/or equivalents will be employed without departing from the spirit and scope of the invention. For example, although the integrated optical components described herein include a Faraday Rotator, other non-reciprocal rotators are also possible. In addition, although the analyzer in each of the multifunctional optical isolators 700, 800, 899 is shown as an absorptive polarizer, and thus is more compact, it is also within the scope of the instant invention to use a different polarizer. Furthermore, in some embodiments, the integrated optical component will include one or more antireflection (AR) coatings, as required. Accordingly, the scope of the invention is therefore intended to be limited solely by the scope of the appended claims.

What is claimed is:

1. A multifunctional optical isolator comprising:
   an input port for transmitting an input beam of light;
   input optics optically disposed between the input port and an output port, the input optics comprising a first polarizer for transmitting light having a first polarization;
   a second polarizer optically disposed between the input optics and the output port oriented to transmit light having a second polarization, the first polarization being different than the second polarization; and
   a non-reciprocal rotator optically disposed between the input optics and the second polarizer oriented to rotate a polarization of light transmitted therethrough such that light propagating in a forward propagating direction having the first polarization passes through the second polarizer to the output port, and light propagating in a backward propagation direction having the second polarization is not passed through the first polarizer to the input port,
   wherein the input optics comprises a wedge having a partially reflective coating disposed on a first face thereof, the partially reflective coating for reflecting a first portion of the input beam of light away from the wedge and allowing a second portion of the input beam of light to pass into the wedge, the first face oriented to receive the input beam of light at a non-normal angle of incidence and refracting the second portion of the input beam of light to a second face of the wedge, the first face tilted relative to the second face by a predetermined wedge angle, at least one of the non-normal angle of incidence or the predetermined wedge angle determined in dependence upon a refractive index of a wedge material and a target anamorphic magnification of the input beam of light.

2. The multifunctional optical isolator of claim 1, wherein the first polarization is parallel to a first axis and the second polarization is at 45° to the first axis.

3. The multifunctional optical isolator of claim 2, wherein the second polarizer is an absorptive polarizer having a polarization axis substantially at 45° to the first axis, and the non-reciprocal rotator is a Faraday rotator for rotating the polarization of light transmitted from the input optics by 45°.

4. The multifunctional optical isolator of claim 3, wherein the first polarizer is an absorptive polarizer having a polarization axis substantially parallel to the first axis, and wherein the wedge is a glass wedge coupled to the first polarizer.

5. The multifunctional optical isolator of claim 3, wherein the first polarizer and the wedge are integrated in a single birefringent wedge, the birefringent wedge having an optic axis substantially parallel to the first axis.

6. The multifunctional optical isolator of claim 3, wherein the wedge is formed from an isotropic material, and wherein the first polarizer and partially reflective coating are integrated in a single polarization dependent coating disposed on the first face.

7. The multifunctional optical isolator of claim 3, wherein the wedge is formed from an isotropic material, and wherein the partially reflective coating includes the first polarizer.

8. The multifunctional optical isolator of claim 3, wherein the wedge is formed from an isotropic material, and wherein the partially reflective coating provides partial reflection for p-polarized light and high reflection for s-polarized light.

9. The multifunctional optical isolator of claim 3, wherein the wedge angle is between 10° and 50°.

10. The multifunctional optical isolator of claim 1, wherein the input beam of light is a substantially collimated beam of light having an elliptical cross-section.

11. The multifunctional optical isolator of claim 1, wherein the input optics, the non-reciprocal rotator, and the second polarizer are coupled together with a transparent epoxy.

12. The multifunctional optical isolator of claim 1, wherein the input port is for optically coupling to a laser diode that provides the input beam of light, and the output port is for optically coupling to an optical fiber.

13. The multifunctional optical isolator of claim 12, further comprising:
    a first lens disposed between the laser diode and the input optics and a second lens disposed between the second polarizer and the optical fiber.

14. The multifunctional optical isolator of claim 12, wherein the first face is oriented such that the first portion of the input beam of light is directed towards a monitor, the monitor configured to monitor at least one of a wavelength or a power of the input beam of light.

15. The multifunctional optical isolator of claim 12, wherein the input optics, the non-reciprocal rotator, and the second polarizer form an integrated component for use in Transmit Optical Subassembly.

16. A multifunctional optical isolator comprising:
    an input port for transmitting an input beam of light;
    a first polarizer optically disposed between the input port and an output port oriented to transmit light having a first polarization, the first polarizer comprising a birefringent crystal having an optic axis substantially parallel to the first polarization, the birefringent crystal having a first face having a partially reflective coating disposed thereon, the partially reflective coating for reflecting a first portion of the input beam of light away from the birefringent crystal and allowing a second portion of the input beam of light to pass into the birefringent crystal, the first face oriented to receive the input beam of light at a non-normal angle of incidence and refract the second portion of the input beam of light to a second face of a wedge, the first face tilted relative to the second face by a predetermined wedge angle, at least one of the non-normal angle of incidence or the predetermined wedge angle determined in dependence upon a refractive index of the birefringent crystal and a target anamorphic magnification of the input beam of light;

a second polarizer optically disposed between the first polarizer and the output port oriented to transmit light having a second polarization, the first polarization being different than the second polarization; and a non-reciprocal rotator optically disposed between the first polarizer and the second polarizer oriented to rotate a polarization of light transmitted therethrough such that light propagating in a forward propagating direction having the first polarization passes through the second polarizer to the output port, and light propagating in a backward propagation direction having the second polarization is not passed through the first polarizer to the input port.

17. The multifunction optical isolator of claim 16, wherein the wedge angle is between 10° and 50°.

18. The multifunctional optical isolator of claim 16, wherein the first polarizer, the non-reciprocal rotator, and the second polarizer form an integrated component for use in Transmit Optical Subassembly.

19. A multifunctional optical isolator comprising:

an input port for transmitting an input beam of light;

a first polarizer optically disposed between the input port and an output port oriented to transmit light having a first polarization, the first polarizer comprising a polarization dependent coating deposited on a first face of a wedge, the polarization dependent coating for reflecting a first portion of the input beam of light having the first polarization away from the wedge and allowing a second portion of the input beam of light having the first polarization to pass into the wedge, the first face oriented to receive the input beam of light at a non-normal angle of incidence and refracting the second portion of the input beam of light to a second face of the wedge, the first face tilted relative to the second face by a predetermined wedge angle, at least one of the non-normal angle of incidence or the predetermined wedge angle determined in dependence upon a refractive index of a wedge material and a target anamorphic magnification of the input beam of light;

a second polarizer optically disposed between the first polarizer and the output port oriented to transmit light having a second polarization, the first polarization being different than the second polarization; and a non-reciprocal rotator optically disposed between the first polarizer and the second polarizer for rotating a polarization of light transmitted therethrough such that light propagating in a forward propagating direction having the first polarization passes through the second polarizer to the output port, and light propagating in a backward propagation direction having the second polarization is not passed through the first polarizer to the input port.

20. The multifunction optical isolator of claim 19, wherein the wedge angle is between 10° and 50°.

21. The multifunctional optical isolator of claim 19, wherein the first polarizer, the non-reciprocal rotator, and the second polarizer form an integrated component for use in Transmit Optical Subassembly.

* * * * *